(12) United States Patent
Bittles et al.

(10) Patent No.: US 8,495,587 B2
(45) Date of Patent: Jul. 23, 2013

(54) METHOD, APPARATUS OR SOFTWARE FOR SELECTIVELY ACTIVATING A TRACE FUNCTION

(75) Inventors: William Bittles, Hampshire (GB); Paul A Titheridge, Hampshire (GB); David J Vines, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 12/627,015

(22) Filed: Nov. 30, 2009

(65) Prior Publication Data
US 2010/0180159 A1    Jul. 15, 2010

(51) Int. Cl.
*G06F 9/44* (2006.01)

(52) U.S. Cl.
USPC .......................................................... 717/128

(58) Field of Classification Search
USPC .......................................................... 717/128
See application file for complete search history.

(56) References Cited

U.S. PATENT DOCUMENTS

| | | | | |
|---|---|---|---|---|
| 7,058,928 | B2 * | 6/2006 | Wygodny et al. | 717/128 |
| 8,234,631 | B2 * | 7/2012 | Greifeneder et al. | 717/128 |
| 8,370,821 | B2 * | 2/2013 | Haber et al. | 717/151 |
| 2006/0242627 | A1 * | 10/2006 | Wygodny et al. | 717/128 |
| 2007/0162897 | A1 * | 7/2007 | Gerard et al. | 717/130 |
| 2008/0010526 | A1 * | 1/2008 | Modani et al. | 714/30 |
| 2008/0134148 | A1 * | 6/2008 | Clark | 717/128 |
| 2010/0083237 | A1 * | 4/2010 | Kneebone et al. | 717/128 |

OTHER PUBLICATIONS

Page et al. "A Fetch Resident Split Jump Mechanism for Non-Deterministic Processors", Dec. 2001, University of Bristol.*
Tomb et al. "Variably Interprocedural Program Analysis for Runtime Error Detection", Jul. 2007, ACM.*

\* cited by examiner

*Primary Examiner* — Wei Zhen
*Assistant Examiner* — Junchun Wu
(74) *Attorney, Agent, or Firm* — Jeffrey T. Holman

(57) ABSTRACT

A method, apparatus, and a computer program product are disclosed for selectively activating a trace function in a computer program in response to a call of a predetermined trigger code element so that trace data is produced only for those subroutines that call the trigger code element or are called by the trigger code element. The computer program product provides one or more trace code elements for one or more selected subroutines of the computer program stored on internal memory of a digital computer. The trace code elements provide trace data for said selected subroutines. The computer program product also selects a subroutine as a trigger code element, processes the computer program, monitors the call stack for the trigger code element, and enables the trace code elements for each selected subroutine simultaneously present in the call stack if the trigger code element is identified in the call stack.

17 Claims, 5 Drawing Sheets

| Trace Controller Settings | |
|---|---|
| Trigger Code Element | Method 1 |
| Excluded Subroutines | Package 1, Package 2, Package 5 |
| Included Subroutines | Package 2.1 |
| Positive Call Depth Limit | 2 |
| Negative Call Depth Limit | 2 |
| Trace Period | 30s |

Figure 3

| | |
|---|---|
| +18 | com.ibm.ws.util.ThreadPool$Worker.run(ThreadPool.java:1527) |
| +17 | com.ibm.ws.sib.processor.impl.JSLocalConsumerPoint$AsynchThread.run(JSLocalConsumerPoint.java:3560) |
| +16 | com.ibm.ws.sib.processor.impl.JSLocalConsumerPoint.runAsynchConsumer(JSLocalConsumerPoint.java:3265) |
| +15 | com.ibm.ws.sib.processor.impl.JSLocalConsumerPoint.processAttachedMsgs(JSLocalConsumerPoint.java:2490) |
| +14 | com.ibm.ws.sib.processor.impl.AsynchConsumer.processMsgs(AsynchConsumer.java:113) |
| +13 | com.ibm.ws.sib.wsn.msg.impl.SubscriptionImpl.consumeMessages(SubscriptionImpl.java:1433) |
| +12 | com.ibm.ws.sib.wsn.impl.ProducerRoleImpl.deliverMessages(ProducerRoleImpl.java:345) |
| +11 | com.ibm.ws.sib.wsn.webservices.impl.outbound.OutboundClientImpl.notifyConsumer(OutboundClientImpl.java:247) |
| +10 | com.ibm.ws.sib.wsn.webservices.impl.outbound.notification.OutNotifBindStub.notify(OutNotifBindStub.java:835) |
| +9 | com.ibm.ws.webservices.engine.client.Stub$Invoke.invoke(Stub.java:948) |
| +8 | com.ibm.ws.webservices.engine.client.Connection.invoke(Connection.java:497) |
| +7 | com.ibm.ws.webservices.engine.client.Connection.invoke(Connection.java:675) |
| +6 | com.ibm.ws.webservices.engine.client.Connection.invoke(Connection.java:722) |
| +5 | com.ibm.ws.webservices.engine.client.Connection.invokeEngineOneWay(Connection.java:966) |
| +4 | com.ibm.ws.webservices.engine.WebServicesEngine.invoke(WebServicesEngine.java:336) |
| +3 | com.ibm.ws.webservices.engine.PivotHandlerWrapper.invoke(PivotHandlerWrapper.java:229) |
| +2 | com.ibm.ws.webservices.engine.PivotHandlerWrapper.invoke(PivotHandlerWrapper.java:229) |
| +1 | com.ibm.ws.webservices.engine.handlers.jaxrpc.JAXRPCHandler.invoke(JAXRPCHandler.java:152) |
| 0 | com.ibm.ws.webservices.engine.PivotHandlerWrapper.invoke(PivotHandlerWrapper.java:229) |
| -1 | com.ibm.ws.webservices.engine.transport.http.HTTPSender.invoke(HTTPSender.java:582) |
| -2 | com.ibm.ws.webservices.engine.transport.http.HttpOutChanConn.sendSOAPRequest(HttpOutServContImpl.java:353) |
| -3 | com.ibm.ws.http.channel.outbound.impl.HttpOutServContImpl.finishRequestMessage(HttpOutServContImpl.java:1194) |
| -4 | com.ibm.ws.http.channel.outbound.impl.HttpOutServContImpl.startResponseReadSync(HttpOutServContImpl.java:1774) |
| -5 | com.ibm.ws.http.channel.outbound.impl.HttpOutServContImpl.readSyncResponse(HttpOutServContImpl.java:724) |
| -6 | com.ibm.ws.http.channel.outbound.impl.HttpOutServContImpl.parseRespMesgSync(HttpOutServContImpl.java:1656) |
| -7 | com.ibm.ws.tcp.channel.impl.TCPReadRequestContextImpl.read(TCPReadRequestContextImpl.java:111) |
| -8 | com.ibm.ws.tcp.channel.impl.AioTCPReadReqContImpl.processSyncReadRequest(AioTCPReadReqContImpl.java:182) |
| -9 | com.ibm.ws.tcp.channel.impl.AioSocketIOChannel.readAIOSync(AioSocketIOChannel.java:206) |
| -10 | com.ibm.io.async.AsyncSocketChannelHelper.read(AsyncSocketChannelHelper.java:217) |
| -11 | com.ibm.io.async.AbstractAsyncChannel.multiIO(AbstractAsyncChannel.java:473) |

Figure 4

METHOD, APPARATUS OR SOFTWARE FOR SELECTIVELY ACTIVATING A TRACE FUNCTION

CROSS-REFERENCE TO RELATED APPLICATIONS

This application claims the benefit of priority of European Patent Application No. 09150455.5 entitled "A Method, Apparatus or Software for Selectively Activating a Trace Function," which was filed on Jan. 13, 2009, and is hereby incorporated by reference.

BACKGROUND

When problems are identified in the functioning of computer systems, one method used for analysing the problem is diagnostic tracing. Tracing can be performed by programs external to the program under examination or may be performed with the use of in-line trace code. Gathering such diagnostic trace data may have a significant performance cost and can generate relatively large amounts of data in a short time. Systems exist for limiting which elements of code generate diagnostic trace, but such systems introduce the risk that important information will be missing from the trace. Furthermore, diagnostic tracing also tends to be sequential in nature, which can lead to significant amounts of non-relevant data being generated. Analysis of large amounts of trace data, some of which may not be relevant, is problematic and time consuming.

SUMMARY

An embodiment of the invention provides a method for selectively activating a trace function in a computer program in response to a call of a predetermined subroutine of the computer program. The method includes providing one or more trace code elements for one or more selected subroutines of the computer program. The trace code elements are operable to provide trace data for the selected subroutines. The method also includes selecting a subroutine as a trigger code element. The method also includes running the computer program and monitoring a call stack for the trigger code element. The method also includes enabling the trace code elements for each selected subroutine simultaneously present in the call stack in response to a determination that the trigger code element is identified in the call stack. Other embodiments of methods are also described. Additionally, embodiments of corresponding apparatuses and computer program products are also described.

BRIEF DESCRIPTION OF THE DRAWINGS

Embodiments of the invention will now be described, by way of example only, with reference to the accompanying drawings in which:

FIG. 3 is a table illustrating settings for the trace data controller of FIG. 1;

FIG. 4 is an sample call stack; and

DETAILED DESCRIPTION

Figure 1:
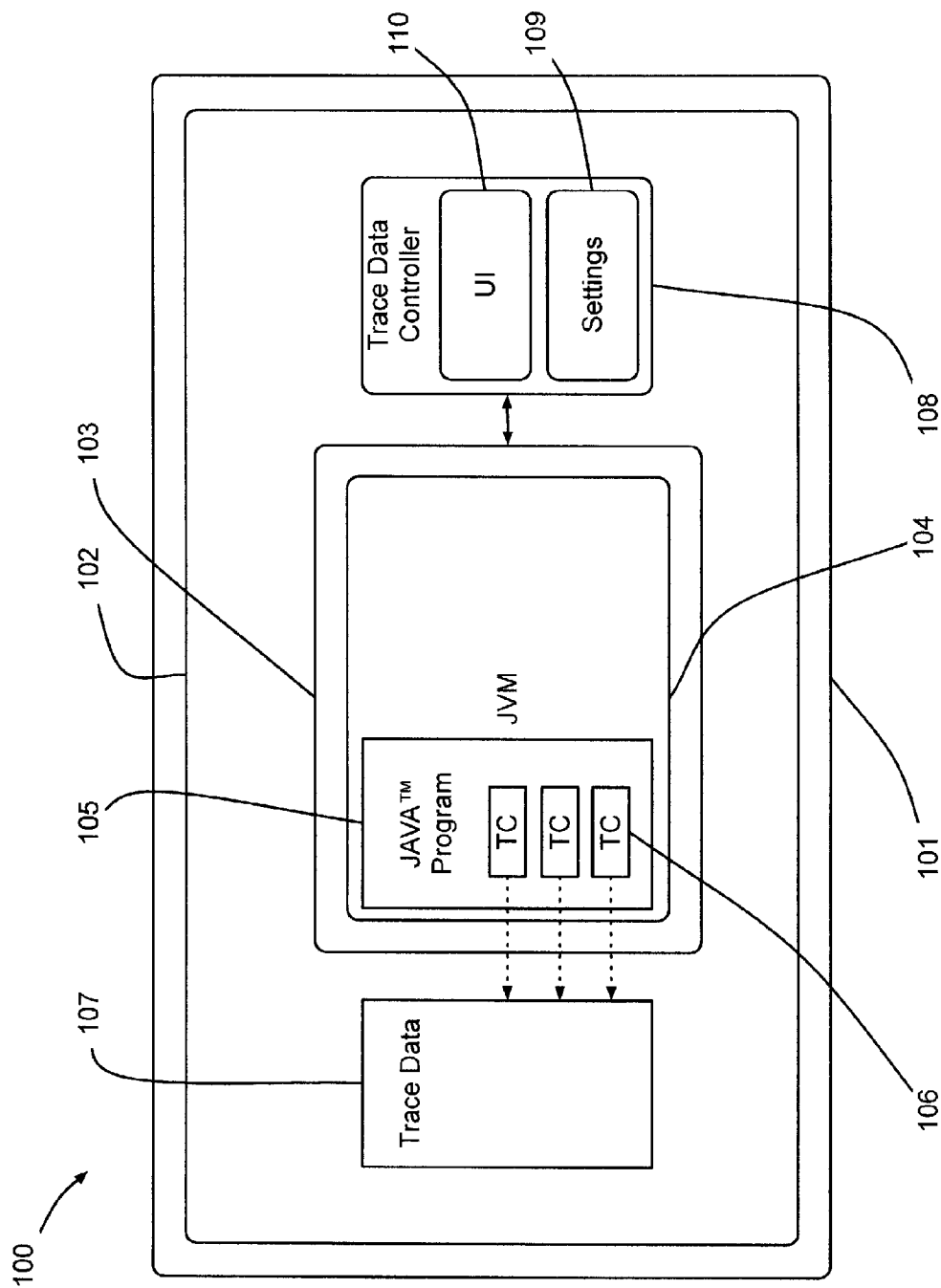
FIG. 1 is a schematic illustration of a computer system arranged to run a computer program and further including a trace data controller.

With reference to FIG. 1, a computer system 100 includes a computer 101 loaded with an operating system 102 and a virtual machine (VM) processing environment in the form of Java™ (Java and all Java-based trademarks and logos are trademarks of Sun Microsystems, Inc. in the United States, other countries or both) Runtime Environment (JRE) 103. The JRE 103 provides a Java™ virtual machine (JVM) 104 arranged to process a Java™ program 105, which in the present embodiment, is augmented with in-line trace code elements 106. The trace code elements 106 are arranged to provide selected trace data 107 when the program 105 is run. The computer system 100 further includes a trace data controller (TDC) 108, which is arranged to control the enabling or disabling of the trace code elements 106 in accordance with a group of settings 109. In the present embodiment, the settings are determined in response to user input via a user interface (UI) 110.

Figure 2:
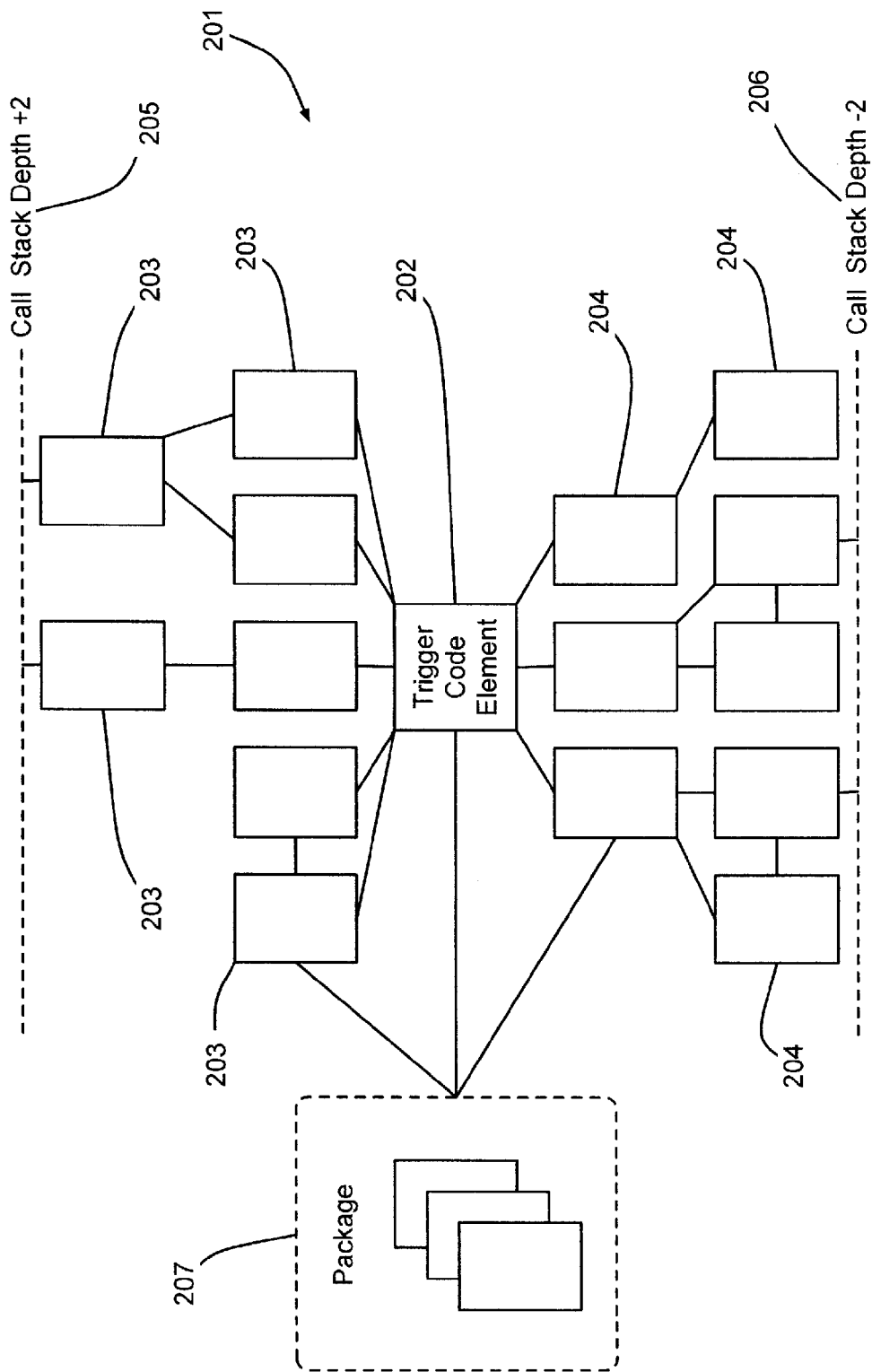
FIG. 2 is a schematic illustration of subroutine calls in the computer program of FIG. 1.

With reference to FIG. 2, when the JVM 104 processes the Java™ program 105 a call stack 201 is created within the JVM 104. The call stack 201, shown schematically in FIG. 2, defines the pattern of calls and returns between subroutines over a period of the processing of the program 105. The trace data controller (TDC) 108 is arranged to monitor the processing of the program 105 for the processing of a predetermined trigger code element 202, that is, a predetermined subroutine within the code. In response to the processing of the trigger code element 202, the TDC 108 is arranged to enable the trace code elements 106 in each other subroutine in the program 105 that either calls the trigger code element 202 or is called by the trigger code element 202. In the present embodiment, the TDC 108 is arranged to access the call stack 201 and enable or disable the trace code element 106 via suitable application program interfaces (APIs) provided by the JRE 103. In FIG. 2, the subroutines 203 calling the trigger code element 202, either directly or indirectly, are shown above the trigger code element 202. The subroutines 204 called by the trigger code element 202, either directly or indirectly, are shown below the trigger code element 202.

The TDC 108 is arranged to limit enabling of the trace code elements 106 to those subroutines within a predetermined call depth 205, 206 relative to the trigger code element 202. In the example of FIG. 2, the enabling of the trace code elements 106 is limited to those subroutines within 2 calls or returns relative to the trigger code element 202. In FIG. 2, only those subroutines within the trace call depth limit 205, 206 are shown. The TDC 108 is arranged to further restrict the enabling of the trace code elements 106 by excluding a predetermined set of subroutines 207 even if those excluded subroutines 207 are within the trace call depth limit 205, 206.

With reference to FIG. 3, the trace controller settings 109 are used to store an identification of the trigger code element 202 and the positive and negative call depths 205, 206. The settings 109 also define the excluded subroutines 207, which in the present embodiment, are defined in terms of Java™ packages. In addition, any exceptions from the excluded packages, that are required to be traced, are defined in an included subroutine setting 301. The settings 109 further provide a trace period 302 for limiting the time for which the trace code elements 106 in the relevant subroutines are enabled.

The TDC 108 is arranged to sample the stack 201 continually since the subroutines present on the stack change over time. In the present embodiment, the frequency of the stack sampling is determined by the time taken to process the previous stack sample. The position or presence of the trigger code element 202 may vary along with the subroutines that fall within the trace call depth limit 205, 206. Thus, the trace code elements 106 that are enabled may vary over time, based on the state of the stack 201 in a given stack sample. In addition, a plurality of occurrences of the trigger code element 202 may be present in a given stack sample. In this case, the TDC 108 is arranged to enable the trace code elements for all subroutines that fall within the trace call depth limit 205, 206 of each such occurrence.

FIG. 4 shows a sample of the call stack for an instance of the Websphere™ Application Server application program from the IBM™ Corporation. In this sample, the trigger code element 202 is a method named:

PivotHandlerWrapper.invoke

The trace call depth limit 205, 206 is set to ±2. In this example, assuming all subroutines are augmented with respective trace code elements 106, the following subroutines will have their trace code elements 106 enabled:

Calling Methods:
JAXRPCHandler.invoke
PivotHandlerWrapper.invoke
Called Methods:
HTTPSender.invoke
HttpOutChanConn.invoke However, in the example in FIG. 4, there are two further occurrences of the trigger code element 202 at lines +3 and +2 of the stack sample. Hence the following further subroutines will have their respective trace code elements 106 enabled:

Calling Methods:
Connection.invokeEngineOneWay
WebServicesEngine.invoke

In other words, the set of subroutines for which tracing will be enabled is the union of the three overlapping sets of lines in the given stack sample around the three occurrences of the trigger code element 202 in accordance with the specified trace call depth limit 205, 206, that is, the subroutines on lines +5 to −2 of the stack sample of FIG. 4. If the occurrences of the trigger code elements were further apart, the set of subroutines for which tracing would be enabled may be the union of two or more non-overlapping sets of subroutines.

Thus, the above six subroutines will produce trace data 107 while they remain positioned within the call depth limit 205, 206 of their respective occurrences of the trigger code element 202 present in the stack 201 as shown in FIG. 4.

Figure 5:
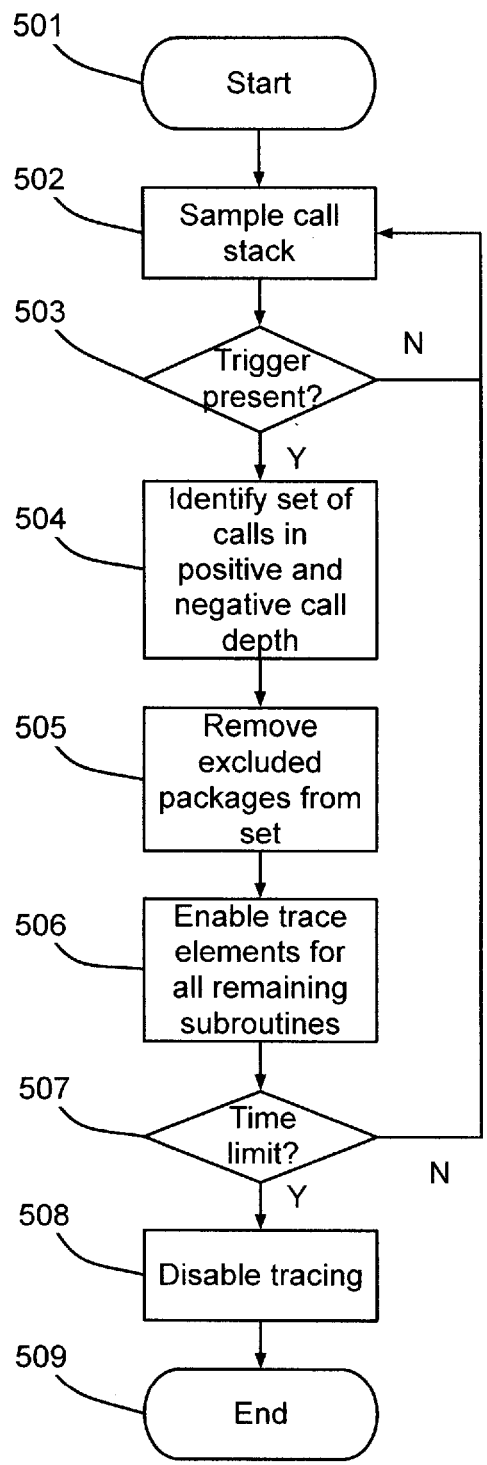
FIG. 5 is a flow chart illustrating the processing performed by the trace data controller of FIG. 1 in accordance with the settings of FIG. 3.

The processing performed by the TDC 108 when monitoring the stack 201 for a given trigger code element 106 and controlling the relevant trace code elements 106 will now be described in further detail with reference to the flowchart of FIG. 5. At step 501, processing of the TDC 108 is initiated in response to the processing of the program 105 and processing moves to step 502. At step 502, the call stack is sampled and processing moves to step 503. At step 503, the call stack sample is inspected for any occurrences of the trigger code element 202 and if so processing moves to step 504. At step 504, the set of candidate subroutines on the call stack within the trace call depth of each occurrence of the trigger code element 202 are identified and processing moves to step 505. At step 505 any subroutines covered by the excluded subroutines setting 207, taking into account the included subroutines setting 301, are removed from the set of candidate subroutines and processing moves to step 506. At step 506, the trace code elements for each remaining subroutine in the set of candidate subroutines are enabled and processing moves to step 507. At step 507, the trace period is set and processing loops through steps 502 to 507 as described above until the trace period expires. When the trace period expires, processing moves to step 508 where all active trace code elements are disabled and processing moves to step 509 and ends.

As will be understood by those skilled in the art, a JRE is commonly arranged to process Java™ programs by interpreting the Java™ bytecode. Alternatively Java™ bytecode may be processed using a Just-in-Time (JIT) compiler.

In another embodiment, the trace data controller (TDC) is arranged to monitor the processing of a software program that is compiled for processing on an operating system. The TDC is arranged to monitor and sample the call stack created by the operating system kernel when processing the compiled program.

In a further embodiment, rather than the trace code elements being provided within the program code and enabled or disabled by the TDC, the TDC is arranged to insert the trace code elements into the code in response to the identification of a given trigger code element in a call stack sample. The TDC may be further arranged to remove inserted trace code elements from a given subroutine in order to disable trace for that subroutine.

In another embodiment, the user interface is arranged to enable trace to be disabled in response to user command. In other words, a user may disable trace prior to the trace period having elapsed. In a further embodiment, the user interface is arranged to enable a user to remove all trace code elements from the program code. In another embodiment, no trace period is defined and the production of trace data is disabled manually. In a further embodiment, a plurality of trigger code elements are provided, each being arranged to trigger the enablement of respective trace functionality within a predetermined call depth range. In another embodiment, the call depth limit is arranged to vary over time. For example, the call depth limit may increase or decrease over time. In a further embodiment, one or more call depth bands is defined relative to the trigger code element and only subroutines within those bands may have their respective trace code element enabled.

In a further embodiment, the TDC is provided as code for running within the JRE so as to enable direct access for the TDC to the call stack 201 and to enable direct control of the enabling or disabling of relevant trace code elements.

Some embodiments may be provided in environments where method-overloading techniques are used. In such environments, embodiments may be arranged to supply the method signature for the trigger code element, including the method parameters, in the same syntax as the programming language. The method signature is then converted into the unique method signature generated by the compile/runtime environment and thereby enables the trigger code element to be distinguished from other versions of the method. Other embodiments may provide rules that allow a user to specify the unique method name that is generated by the compiler, for example:

class.methodname@int@int;
or
class.methodname@String@String.

To enable a user to set the trigger code element to be a method of a parameterized type, embodiments may be arranged to support multiple trigger code elements or to provide a method where a condition is specified based on the parameterized type. For example, if the trigger code element is:

List<T>.addNode then either, any occurrence of "addNode" is a trigger code element, or the user can specify a condition such as:

List<T>.addNode, where T equal String.

In some embodiments, the apparatus may be a general purpose device having software arranged to provide a part or all of the functionality described herein. The device could be a single device or a group of devices and the software could be a single program or a set of programs. Furthermore, any or all of the software used to implement the embodiments can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art, in light of the description herein. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A computer program product comprising:
   a non-transitory computer readable storage device having computer readable instructions stored thereon, wherein the computer readable instructions when executed by processor, are configured to perform operations comprising:
   providing one or more trace code elements for one or more selected subroutines of a computer program stored on internal memory of a digital computer, said trace code elements being operable to provide trace data for said selected subroutines;
   selecting a subroutine as a trigger code element;
   processing said computer program and monitoring the call stack for said trigger code element;
   determining a call depth limit for said trigger code element, the call depth limit defining positive and negative call depths relative to said trigger code element;
   enabling said trace code elements in response to said trigger code element being present in said call stack only for those selected subroutines within said call depth limit relative to said trigger code element; and
   enabling said trace code elements for each said selected subroutine simultaneously present in said call stack in response to a determination that said trigger code element is identified in said call stack.

2. The computer program product of claim 1 in which said positive and negative call depths are of different magnitudes.

3. The computer program product of claim 1 in which said call depth limit is arranged to vary over time.

4. The computer program product of claim 1 wherein the computer readable instructions are configured to perform further operations comprising determining a set of excluded subroutines for which said respective trace code elements are excluded from enablement.

5. The computer program product of claim 1 wherein the computer readable instructions are configured to perform further operations comprising inserting said trace code elements into said selected subroutines in response to said trigger code element being simultaneously present in said call stack.

6. The computer program product of claim 1 wherein the computer readable instructions are configured to perform further operations comprising disabling said trace code elements in response to a determination that at least one of said trace code elements for said selected subroutines has been enabled and subsequently said trigger code element is no longer simultaneously present in said call stack.

7. The computer program product of claim 1 in which said trigger code element comprises at least one of said trace code elements.

8. The computer program product of claim 1 in which selecting a subroutine as a trigger code element comprises selecting a plurality of trigger code elements.

9. The computer program product of claim 1 wherein the computer readable instructions are configured to perform further operations comprising disabling said trace code elements in response to user input.

10. The computer program product of claim 1 wherein the computer readable instructions are configured to perform further operations comprising disabling said trace code elements after a predetermined period.

11. The computer program product of claim 1 wherein the computer readable instructions are configured to perform further operations comprising enabling said trace code elements for any subroutine that is called by a trace enabled subroutine and any subroutine that calls a trace enabled subroutine.

12. A method for selectively activating a trace function in a computer program in response to a call of a predetermined subroutine of said computer program, said method comprising:
   providing one or more trace code elements for one or more selected subroutines of a computer program stored on internal memory of a digital computer, said trace code elements being operable to provide trace data for said selected subroutines;
   selecting a subroutine as a trigger code element;
   processing said computer program and monitoring a call stack for said trigger code element;
   determining a call depth limit for said trigger code element, the call depth limit defining positive and negative call depths relative to said trigger code element;
   enabling said trace code elements in response to said trigger code element being present in said call stack only for those selected subroutines within said call depth limit relative to said trigger code element; and
   enabling said trace code elements for each said selected subroutine simultaneously present in said call stack in response to a determination that said trigger code element is identified in said call stack.

13. A method according to claim 12 further comprising:
   determining a set of excluded subroutines for which said respective trace code elements are excluded from enablement.

14. A method according to claim 12 further comprising inserting said trace code elements into said selected subroutines in response to said trigger code element being simultaneously present in said call stack.

15. A method according to claim 12 further comprising disabling said trace code elements in response to a determination that at least one of said trace code elements for said selected subroutines has been enabled and subsequently said trigger code element is no longer simultaneously present in said call stack.

16. A method according to claim 12 further comprising:
   enabling said trace code elements for any subroutine that is called by a trace enabled subroutine and any subroutine that calls a trace enabled subroutine.

17. Apparatus for selectively activating a trace function in a computer program in response to a call of a predetermined subroutine of said computer program, said apparatus being operable to:
   provide trace code elements for one or more selected subroutines of a computer program stored on internal memory of a digital computer, said trace code elements being operable to provide trace data for said selected subroutines;
select a subroutine as a trigger code element;
process, via a processor, said computer program and monitor the call stack for said trigger subroutine;
determine a call depth limit for said trigger code element, the call depth limit defining positive and negative call depths relative to said trigger code element;
enable said trace code elements in response to said trigger code element being present in said call stack only for those selected subroutines within said call depth limit relative to said trigger code element; and
enable said trace code elements for each said selected subroutine simultaneously present in said stack in response to a determination that said trigger subroutine is identified in said call stack.

* * * * *